W. S. WHITE.
DEMOUNTABLE RIM FOR AUTOMOBILE WHEELS.
APPLICATION FILED NOV. 8, 1919.

1,369,584.

Patented Feb. 22, 1921.
4 SHEETS—SHEET 1.

Inventor
Willard S. White
By
C. L. Parker
Attorney

W. S. WHITE.
DEMOUNTABLE RIM FOR AUTOMOBILE WHEELS.
APPLICATION FILED NOV. 8, 1919.
1,369,584.
Patented Feb. 22, 1921.
4 SHEETS—SHEET 2.
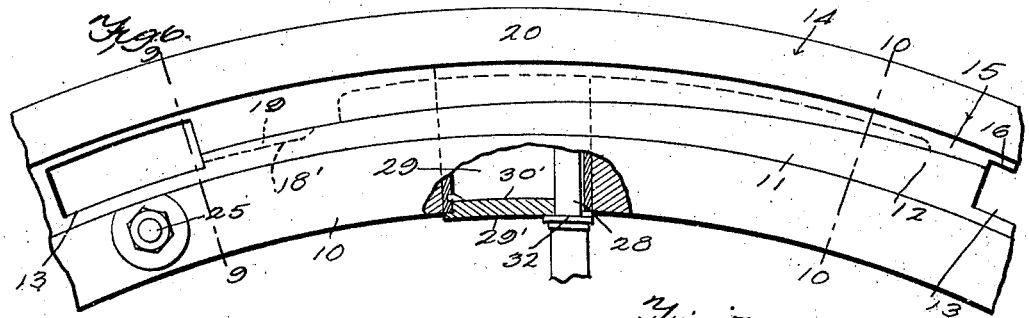
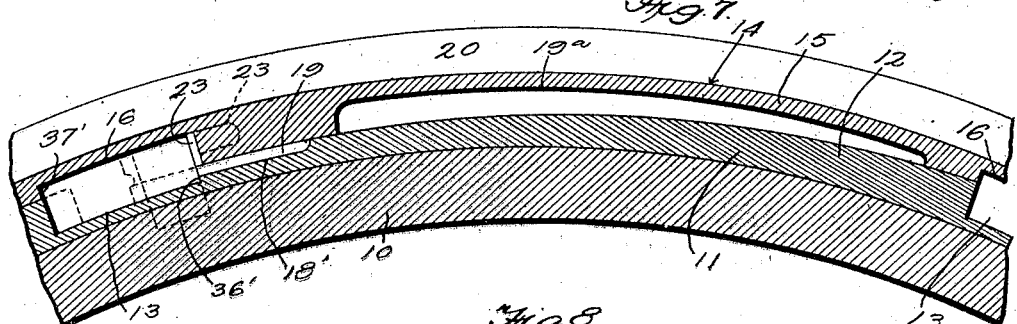
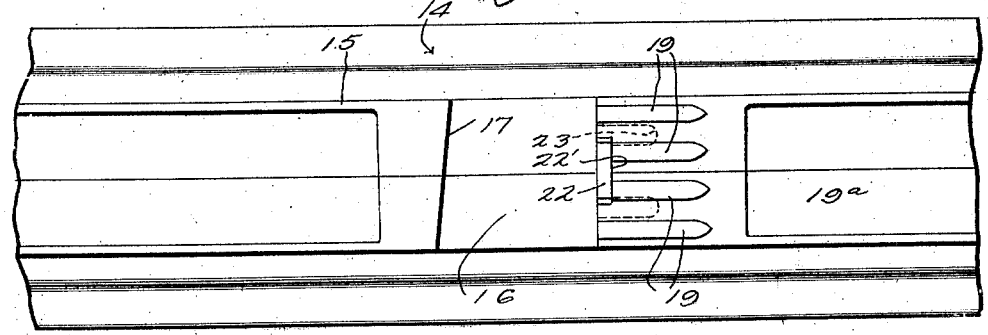
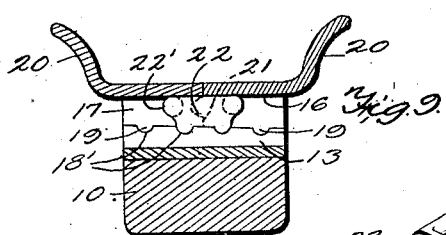
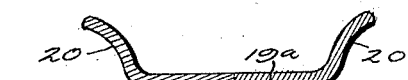
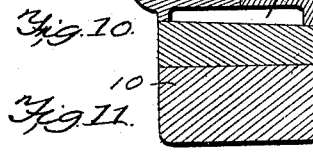
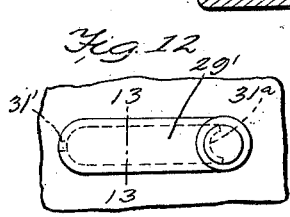
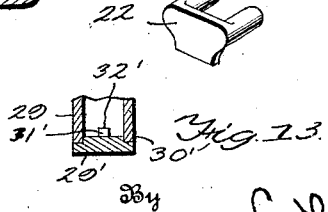
Inventor
Willard S. White,
By C. L. Parker, Attorney W. S. WHITE.
DEMOUNTABLE RIM FOR AUTOMOBILE WHEELS.
APPLICATION FILED NOV. 8, 1919.
1,369,584.
Patented Feb. 22, 1921.
4 SHEETS—SHEET 3.
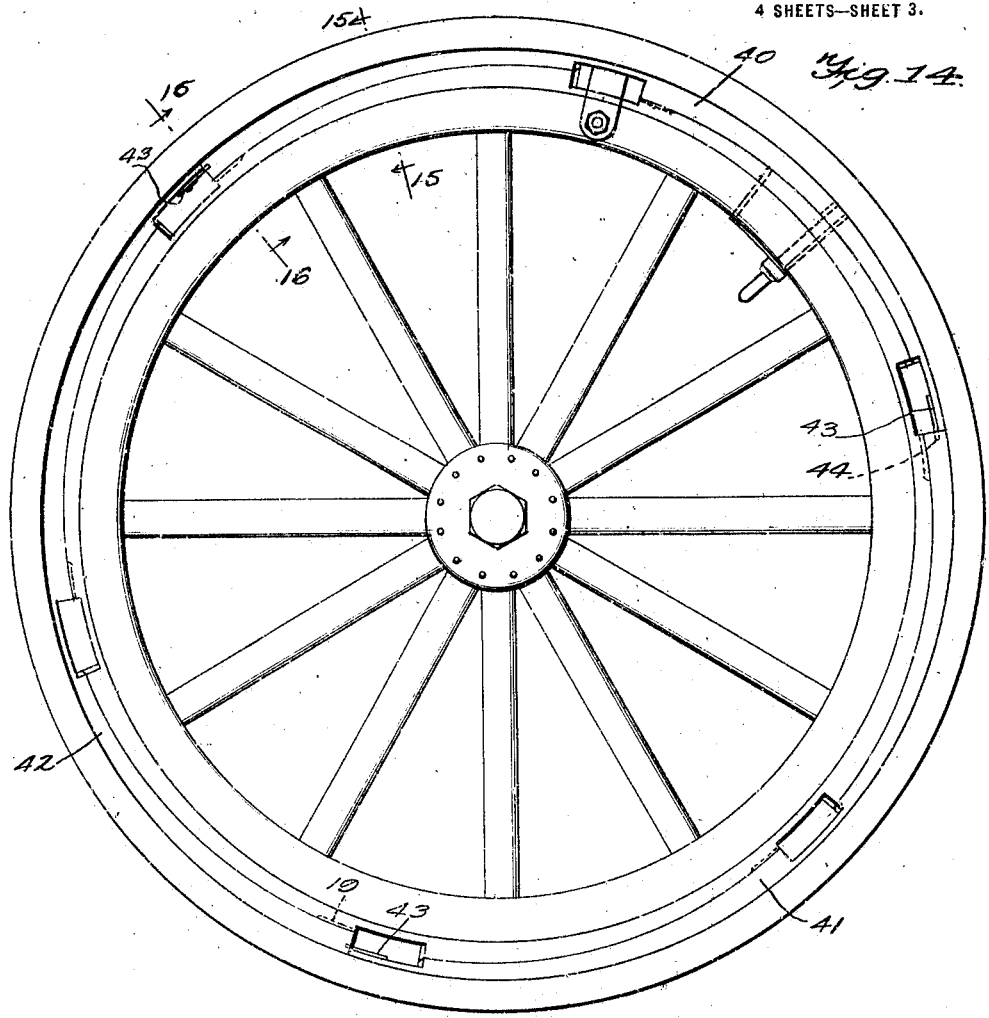
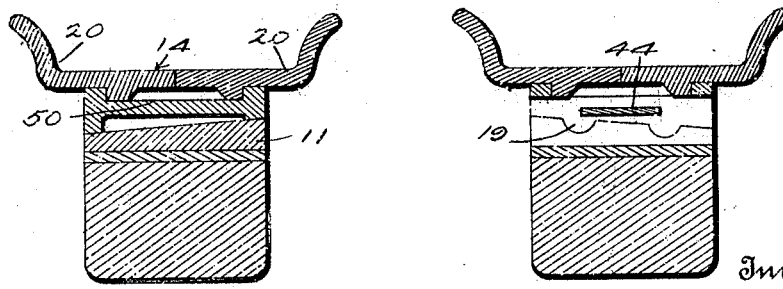
Inventor
Willard S. White
By C. L. Parker, Attorney

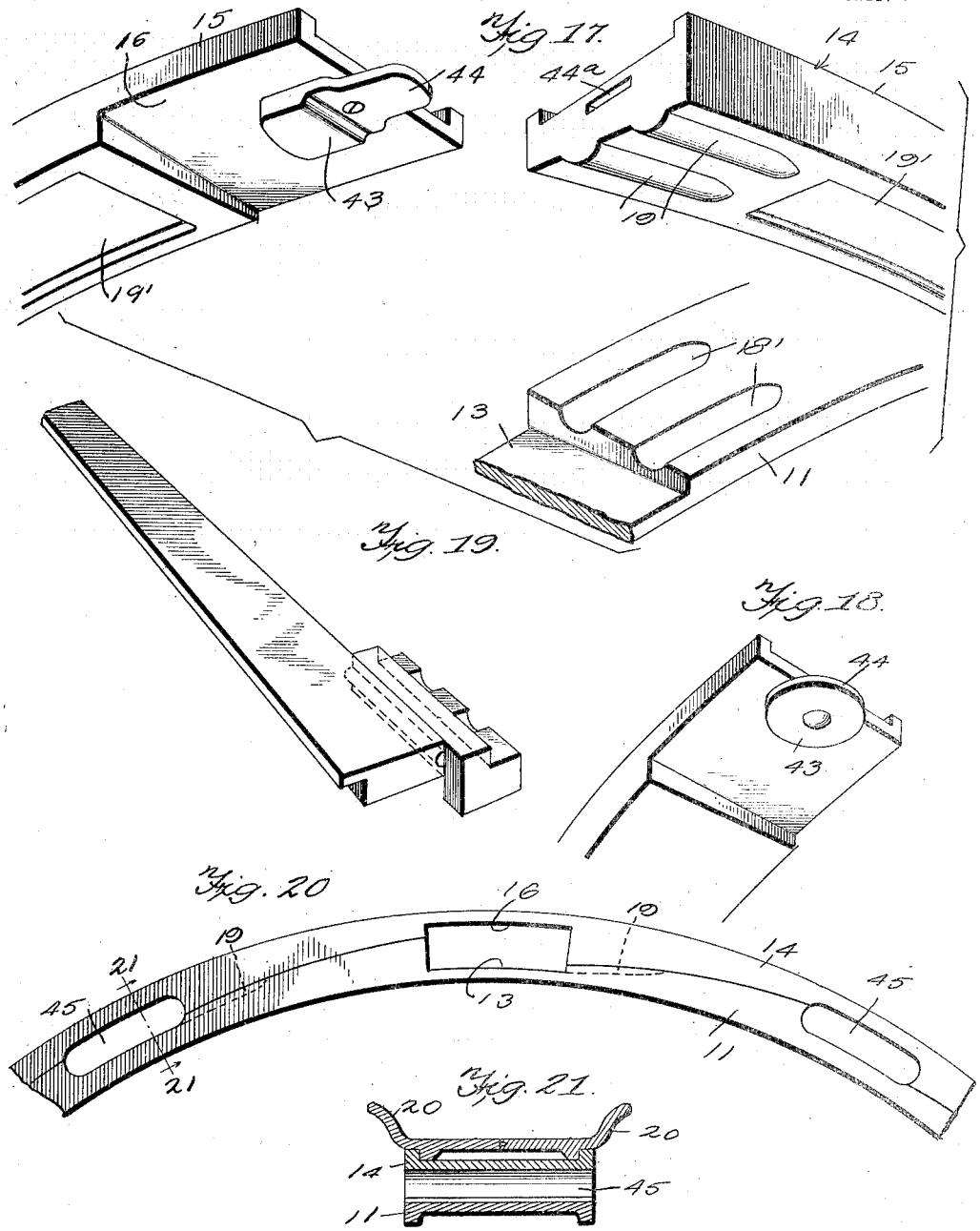

UNITED STATES PATENT OFFICE.

WILLARD S. WHITE, OF CHATTANOOGA, TENNESSEE.

DEMOUNTABLE RIM FOR AUTOMOBILE-WHEELS.

1,369,584.  Specification of Letters Patent.  Patented Feb. 22, 1921.

Application filed November 8, 1919. Serial No. 336,551.

*To all whom it may concern:*

Be it known that I, WILLARD S. WHITE, a citizen of the United States, residing at Chattanooga, in the county of Hamilton and State of Tennessee, have invented certain new and useful Improvements in Demountable Rims for Automobile-Wheels, of which the following is a specification.

My invention relates to improvements in demountable rims for automobile wheels.

An important object of the invention is to provide apparatus of the above mentioned character, which is simple in construction, inexpensive to manufacture, strong, durable, and highly convenient in placing and removing the demountable rim upon and from the wheel.

A further object of the invention is to provide means whereby the maximum degree of contact area is afforded between the demountable rim and the permanent rim of the wheel, thereby bringing these parts of the wheel into firm holding relation, without causing such parts to have a sticking or binding action, upon removing the demountable rim.

Other objects and advantages of the invention will be apparent during the course of the following description.

In the accompanying drawings forming a part of this specification and in which like numerals are employed to designate like parts throughout the same:

Fig. 6 is an enlarged fragmentary side elevation of the rim, parts being shown in section for the purpose of illustration;

Fig. 7 is an enlarged central longitudinal section, taken in the plane of rotation of the wheel;

Fig. 8 is a side elevation of the inner side of the rim removed;

Fig. 9 is a transverse sectional view, taken on line 9—9 of Fig. 6;

Fig. 10 is a similar view, taken on line 10—10 of Fig. 6;

Fig. 11 is a perspective view of a key for holding the sections of the rim together;

Fig. 12 is a plan view of a dust-cap;

Fig. 13 is a transverse sectional view, taken on line 13—13 of Fig. 12;

Fig. 14 is a side elevation of a wheel, embodying a slightly modified form of my invention;

Fig. 15 is a section on line 15—15 of Fig. 14, looking in the direction of the arrows;

Fig. 16 is a section on line 16—16, looking in the direction of the arrow;

Fig. 17 is a fragmentary detached perspective of the demountable rim and a portion of the fixed or inner rim;

Fig. 18 shows a slightly modified form of button lug;

Fig. 19 is a perspective of the wedge for removing the demountable rim;

Fig. 20 is a fragmentary side elevation of a further modified form of rim; and

Fig. 21 is a section, taken on line 21—21 of Fig. 20.

Figure 1:
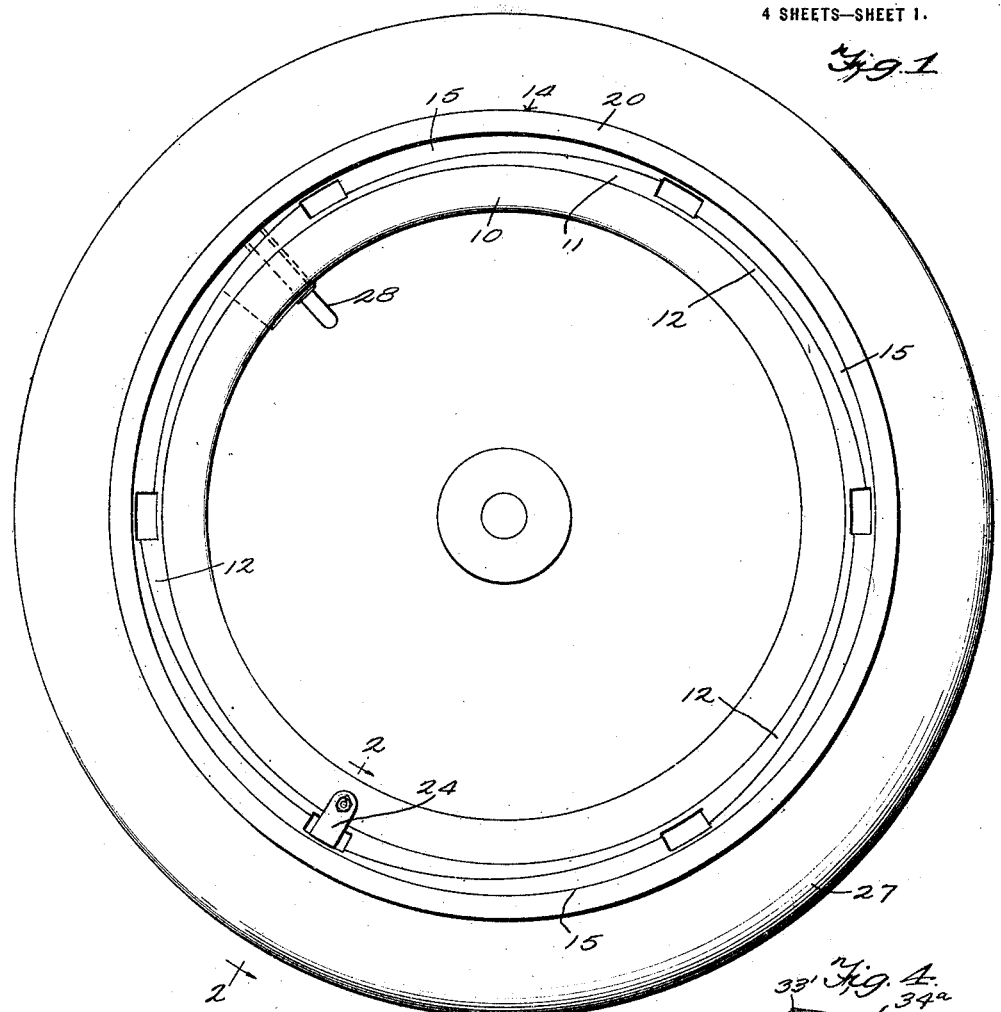
Figure 1 is a side elevation of a wheel embodying my invention.
Figure 2:
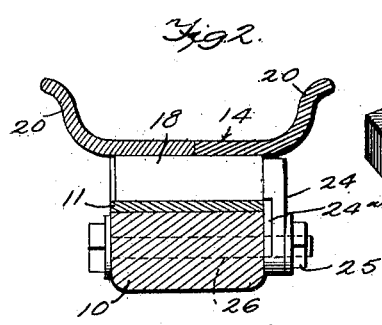
Fig. 2 is a transverse sectional view, taken on line 2—2 of Fig. 1.
Figure 3:
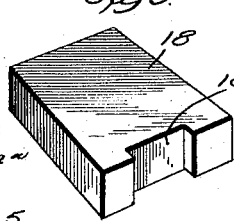
Fig. 3 is a perspective view of a tapered block or wedge.

In the drawings, wherein for the purpose of illustration is shown a preferred embodiment of my invention, the numeral 10 designates the felly of a wheel, upon which is rigidly mounted a permanent rim 11. This permanent rim is provided with circumferentially extending tapered sections 12, which face in the same direction, as shown. Between the reduced end of each section 12 and the enlarged end of the adjacent tapered section 12, is provided a transverse recess 13, to be more fully described.

The numeral 14 designates a demountable rim, provided with interior circumferentially extending and longitudinally tapered sections 15, which face in the same direction, and opposite to the sections 12, whereby the sections 12 and 15 have interfitting engagement, as clearly shown in Fig. 1. At the reduced end of each tapered section 15 is a recess 16, adapted to register with the recess 13 and to provide a main transverse recess, which is rectangular in cross-section, in the plane of rotation of the wheel. As shown in Fig. 8, the end wall 17 of each main recess is preferably inclined, whereby the recess is longitudinally tapered for the reception of a transverse tapered block or wedge 18. This wedge is provided at its outer end with an opening or notch 18ª, for a purpose to be described. In order to render the rim 14 suitably light, the same is provided upon its inner surface with spaced recesses 19ª, spaced from the ends of the tapered sections 15, as clearly shown in Fig. 7.

Each tapered section 12 of the permanent rim 11 is provided adjacent its recess 13, with longitudinal grooves 18', the inner or closed ends of which are tapered, as shown. These grooves lead into the recess 13 and extend therefrom for a substantial distance, as clearly shown in Fig. 7. Adapted to be inserted within the recesses 18' are longitudinal ribs 19, formed integral with each tapered section 15 of the rim 14, at or adjacent the enlarged end thereof. The ribs 19 are preferably tapered at their free ends, thereby rendering it more convenient to insert the same within the grooves 18'. The ribs 19 and the grooves 18' are preferably curved in cross-section, and when the ribs are in the recesses the rim 14 is securely held against lateral displacement with respect to the stationary rim 11.

The rim 14 is preferably formed in two annular sections 20, having tongue and groove connection, as shown at 21. The sections 20 are preferably held together by U-shaped keys or staples 22. The transverse portion of these staples fits within a recess 22', (see Fig. 7) and is flush with the adjacent wall of the main recess. The ends of these staples extend into openings or recesses 23, in the sections 20. It is to be understood that I may employ any suitable number of these keys or staples. The keys or staples have very little, if any, function when the rim 14 is in place upon the felly of the wheel, as the sections 20 thereof are securely held together by means of the interfitting ribs 19 and grooves 18', but this key or keys function to retain the sections together, when the rim 14 is removed from the wheel, and is placed in the tire carrier of the automobile or the like.

The numeral 24 designates a cleat or clip, which serves to hold the tapered block or wedge 18 in place, and has an opening for the reception of a bolt 25, passing through a transverse opening 26 in the felly 10. The cleat 24 enters the opening or notch 18ª of the wedge 18, and this cleat has a longitudinal recess 24ª, extending from points arranged near and spaced from the ends thereof. The function of this recess is to cause the free end of the cleat to contact directly with the wedge 18, and remain spaced from the felly, whereby the entire binding action of the cleat will be transmitted to the wedge.

The numeral 27 designates a pneumatic tire of any well known or preferred construction, held within the rim 14, and this tire is equipped with a valve 28, extending through an opening in the rim 14, and an elongated casing 29, arranged within an opening or slot in the felly of the wheel. It is thus apparent that this valve in no way interferes with the turning movement of the rim 14 with relation to the rim 11.

The inner side of the casing 29, both sides of which are open, is covered by a dust-cap or plate 29', having an inner flange 30', projecting therein. The cap 29' is provided at one end with a lug or tongue 31', fitting in a recess or notch 32' in the end wall of the casing 29. This cap 29' is further provided at one end with a semi-circular recess 31ª, receiving the valve 28. A clamp nut 32 has screw threaded engagement with the valve 28 and serves to hold the cap 29' in place, as shown.

In placing the rim 14 upon the rim 11, the ribs 19 are moved into the recesses 13 and into alinement with the grooves 18'. The rim 14 is now turned clockwise with respect to the rim 11, thereby moving the ribs 19 into the grooves 18'. The tapered block or wedge 18 is inserted in the transverse recess, and held therein by the cleat 24, which is attached to the felly 10 by the bolt 25.

Figure 4:
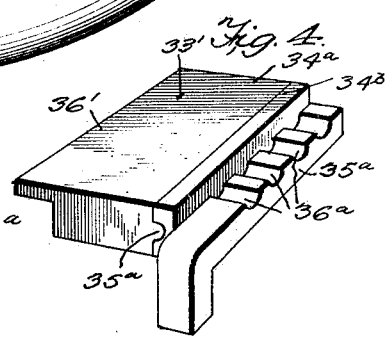
Fig. 4 is a similar view of a starting wedge.
Figure 5:
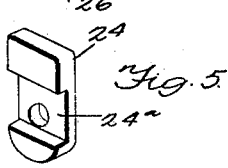
Fig. 5 is a similar view of a cleat or clip.

In removing the tire this operation is reversed. Should the rim 14 stick or bind, it may be released by a starting wedge 33' (see Figs. 4 and 7). This starting wedge is preferably formed in two sections 34ª and 34ᵇ, having tongue and groove slidable connection, as shown at 35ª. The section 34ᵇ has a flange 35', adapted to contact with the reduced end or shoulder 36' of the section 11, and having grooves 36ª adapted for registration with the grooves 18' and hence adapted to receive the ribs 19. The section 34ª of the starting wedge 31' has a flange 36', to contact with a shoulder 38'. It is thus apparent that when the starting wedge is placed within the recess 13 and the section 34ª thereof driven in, the rim 14 will be turned anticlockwise with respect to the rim 11, and hence may be readily separated therefrom.

In the form shown in Figs. 14 to 19, inclusive, I have shown a demountable rim formed of three separable sections 40, 41 and 42. In this form I have also shown but two lugs 19 formed upon the outer rim and a corresponding number of recesses formed in the inner rim. At the joint of each section I have provided a button lug 43 having a tongue 44 adapted to enter a groove 44ª formed in the opposite end of the next section, locking the sections together.

In this form the tire retaining flanges are not formed integrally with the base portion of the demountable rim and accordingly it is necessary that the demountable rim be split longitudinally. As the sections of the rim are separable they are formed with retaining grooves 50 adapted to receive the flanges of the rim. The entire rim is removed simultaneously and the base of the rim may subsequently be removed from the flanges if desired.

I have shown the sections of the rim as being provided intermediate their ends with recesses 45, the metal of the sections tapering from one end to the recess and from the recess to the other end of the rim section. The operation of this form of the invention is similar to that of the form shown in Figs. 1 to 13, inclusive, and further description thereof is unnecessary.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

Having thus described my invention, I claim:

1. The combination with a wheel rim having its periphery formed of a plurality of circumferentially tapering sections, said rim having transverse recesses formed at the ends of said sections, and a plurality of longitudinal grooves communicating with said recesses, of a demountable rim comprising circumferentially tapered sections adapted to register with said wheel rim, said demountable rim being provided with ribs adapted to enter the grooves of the wheel rim, and being provided with transverse recesses adapted to register with the transverse recesses of said wheel rim.

2. The combination with a wheel rim having its periphery formed of a plurality of circumferentially tapering sections, said rim having transverse recesses formed at the ends of said sections, and a plurality of longitudinal grooves communicating with said recesses, of a demountable rim comprising circumferentially tapered sections adapted to register with said wheel rim, said demountable rim being provided with ribs adapted to enter the grooves of the wheel rim, and being provided with transverse recesses adapted to register with the transverse recesses of said wheel rim, and a locking member adapted to enter one of said recesses.

3. The combination with a wheel rim having its periphery formed of a plurality of circumferentially tapering sections, said rim having transverse recesses formed at the ends of said sections, and a plurality of longitudinal grooves communicating with said recesses, of a demountable rim comprising circumferentially tapered sections adapted to register with said wheel rim, said demountable rim being provided with ribs adapted to enter the grooves of the wheel rim, and being provided with transverse recesses adapted to register with the transverse recesses of said wheel rim, tapered blocks adapted to enter said recesses and means for securing said tapered blocks in position.

4. The combination with the permanent rim of a wheel having circumferentially extending longitudinally tapered sections, certain of said sections being provided at their reduced ends with longitudinally extending grooves, said rim being provided with transverse tapered openings having communication with the corresponding ends of the grooves, of a demountable rim having circumferentially extending longitudinally tapered sections to interfit with the first named sections, certain of said second named sections being provided at the enlarged ends with longitudinal ribs to enter the longitudinal grooves, said demountable rim having tapered transverse openings arranged adjacent the corresponding ends of the ribs and adapted for registration with the first named openings, tapered blocks adapted for insertion within the registering transverse openings to engage with the corresponding enlarged ends of the second named sections, and means for securing the tapered blocks in place.

In testimony whereof I affix my signature in presence of two witnesses.

WILLARD S. WHITE.

Witnesses:
S. R. WHITE,
O. V. HEAL.